(12) United States Patent
Heymans et al.

(10) Patent No.: US 8,250,046 B2
(45) Date of Patent: Aug. 21, 2012

(54) CROSS-LANGUAGE SEARCH

(75) Inventors: Maureen Heymans, San Francisco, CA (US); Alexandre Kojoukhov, San Francisco, CA (US); Hui Tan, Mountain View, CA (US); Sha-Mayn Teh, San Mateo, CA (US); Jeffrey Chin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 458 days.

(21) Appl. No.: 12/421,163

(22) Filed: Apr. 9, 2009

(65) Prior Publication Data
US 2009/0193003 A1 Jul. 30, 2009

Related U.S. Application Data

(63) Continuation of application No. 12/235,558, filed on Sep. 22, 2008.

(60) Provisional application No. 60/974,332, filed on Sep. 21, 2007.

(51) Int. Cl.
*G06F 17/30* (2006.01)

(52) U.S. Cl. ........ 707/703; 707/736; 707/758; 707/759; 704/8; 704/9

(58) Field of Classification Search .................. 707/713, 707/708, 756, 736, 758, 759; 704/8, 9
See application file for complete search history.

(56) References Cited

U.S. PATENT DOCUMENTS

| | | | |
|---|---|---|---|
| 6,321,189 B1 | 11/2001 | Masuichi et al. | |
| 6,604,101 B1 | 8/2003 | Chan et al. | |
| 6,757,646 B2 * | 6/2004 | Marchisio | 704/8 |
| 7,058,626 B1 | 6/2006 | Pan et al. | |
| 7,146,358 B1 | 12/2006 | Gravano et al. | |
| 7,269,598 B2 * | 9/2007 | Marchisio | 1/1 |
| 7,475,069 B2 | 1/2009 | Blackman et al. | |
| 7,516,154 B2 * | 4/2009 | Chan | 1/1 |
| 7,720,856 B2 * | 5/2010 | Goedecke et al. | 707/759 |
| 7,783,633 B2 * | 8/2010 | Florian et al. | 707/729 |
| 7,890,493 B2 * | 2/2011 | Chen | 707/713 |
| 8,015,175 B2 * | 9/2011 | Fairweather | 707/713 |
| 2002/0156763 A1 * | 10/2002 | Marchisio | 707/1 |
| 2004/0006560 A1 | 1/2004 | Chan et al. | |
| 2004/0205586 A1 | 10/2004 | Cohen et al. | |
| 2004/0261021 A1 | 12/2004 | Mittal et al. | |
| 2004/0267723 A1 | 12/2004 | Bharat | |
| 2005/0021517 A1 * | 1/2005 | Marchisio | 707/4 |
| 2006/0059132 A1 | 3/2006 | Zhang | |
| 2006/0112091 A1 * | 5/2006 | Chapman et al. | 707/4 |

(Continued)

OTHER PUBLICATIONS

Notification Concerning Transmittal of International Preliminary Report on Patentability, PCT/US2008/077283, Apr. 1, 2010, 7 pages.

(Continued)

*Primary Examiner* — Jean M Corrielus
(74) *Attorney, Agent, or Firm* — Fish & Richardson P.C.

(57) ABSTRACT

Methods, systems, and apparatus, including computer program products, in which a cross-language search can be performed. A search query is received in a first language. A translated search query of the search query is obtained and evaluated to determine whether it is a candidate for cross-language searching. Upon identifying a candidate, a search can be performed using the translated search query to generate search results relevant to the translated search query.

21 Claims, 10 Drawing Sheets

U.S. PATENT DOCUMENTS

| | | | |
|---|---|---|---|
| 2006/0173829 | A1 | 8/2006 | Neeman |
| 2006/0173886 | A1 | 8/2006 | Moulinier et al. |
| 2007/0022102 | A1 | 1/2007 | Saxena |
| 2007/0027905 | A1 | 2/2007 | Warren et al. |
| 2008/0177528 | A1 | 7/2008 | Brewes |
| 2008/0189257 | A1 | 8/2008 | Wiseman et al. |
| 2008/0222140 | A1 | 9/2008 | Lagad et al. |
| 2008/0228748 | A1* | 9/2008 | Fairweather ................ 707/5 |
| 2009/0024595 | A1* | 1/2009 | Chen ................ 707/4 |

OTHER PUBLICATIONS

Notification International Search Report and the Written Opinion of the International Searching Authority; PCT/US2008/077283; Jan. 30, 2009, 12 pages.

Bertoldi N et al., 'ITC-irst at CLEF 2003: monolingual, bilingual, and multilingual information retrieval, Comparative Evaluation of Multilingual Information Access Systems', 4th Workshop of the Cross-Language Evaluation Forum, CLEF 2003, Revised Papers (Lecture Notes in Computer Science vol. 3237, pp. 140-151) XP002595886 Springer-Verglag, Berlin, Germany, 2004.

Larkey L.S., et al., 'Structured queries, language modeling, and relevance modeling in cross-language information retrieval', Information Processing and Management—Cross—Language Information Retrieval, May 2005, vol. 41, No. 3, May 2005, pp. 457-473, XP002596060, Elsevier Ltd GB.

European Examiner Lars Eichenauer, European Supplementary European Search Report, for Application No. EP08832151.8, dated Aug. 11, 2010, 5 pages.

European Examiner Lars Eichenauer, Communication pursuant to Article 94(3) EPC, for Application No. EP 08 832 151.8 dated Dec. 21, 2010, 9 pages.

"Google's Cross-Language Search Launches", May 24, 2007, SearchEngineWatch.com, 3 pages.

Erbach, G. and Uszkoreit, H. Mulinex. Multlingual Indexing, Navigation and Editing Extensions for the World Wide Web. D 0.19 Final Report. Version 1.0, May 15, 1999. 30 pages.

* cited by examiner

CROSS-LANGUAGE SEARCH

CROSS-REFERENCE

This Application is a continuation of U.S. application Ser. No. 12/235,558, filed on Sep. 22, 2008, which claims the benefit of U.S. Provisional Application Ser. No. 60/974,332, filed on Sep. 21, 2007.

BACKGROUND

This disclosure is related to cross-language searching.

The number of web pages written in certain languages (e.g., English) may be much larger than the number of web pages written in other languages. This disparity is due in large part to the number of speakers of the certain languages and the widespread availability of technology in the countries where those languages are spoken. Moreover, such pages are often better maintained and capable of providing more accurate and updated information about many subjects than are pages in other languages. Accordingly, people who speak a language that is not widely used on the web might nevertheless be interested in the information found on a web page available in other languages (e.g., English). Thus, searching the web pages written in the language used to submit a search query may not always satisfy a searcher's query, because relevant results might not even exist in the searcher's language.

For example, people in Egypt are sometimes interested in information about traveling to places that are outside of the Middle East, studying in foreign universities, or learning about famous non-Egyptian people. However, there might not be many pages related to these topics in the language used to submit the query, i.e., the user's native language. Moreover, the pages that are in the user's native language may be of relatively low quality, since the authors of the page may not have ample access to such topics. Additionally, such users may not be able to issue queries in another language because the users do not speak another language. Thus, these users may be unable to find relevant and/or quality content.

SUMMARY

In general, one aspect of the subject matter described in this specification can be embodied in a system that includes an input module, an evaluation module and an output module. The input module can receive an original search query in a first language, the original search query being a request for documents relevant to the original search. The evaluation module can receive a first set of relevance scores associated with results from the original search query and a second set of relevance scores associated with results from a translated search query in a second language. The evaluation module can compare the first and second sets of relevance scores to determine whether the original search query or the translated search query produces the most relevant results. The output module can provide search results including at least a portion of one or both of the results from the original search query or the results from the translated search query to a user based on the whether the original search query or the translated query has the most relevant results. Other embodiments of this aspect include corresponding methods, apparatus, and computer program products.

An example method for performing cross-language searching can include: receiving an original search query in a first language; obtaining a translated search query associated with the original search query, the translated search query being in a second language; evaluating the translated search query to determine whether the translated search query is a candidate for a cross-language search based on: a relevancy score associated with the results of the translated search query, a translation confidence score associated with the translation, or a search query including an entity associated with the first or second languages; and serving a search results page based on the result of the evaluation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

In some implementations of this specification, systems and methods are realized that receive a search query from a client device and determine if a web page in a foreign language is a good match to the query. For example, if a user in Egypt enters a query in Arabic for a subject such as American football, there might not be many web pages in the query language that provide relevant results for the query. However, there may be relevant pages in other languages. For example, the Arabic query from the previous example can be translated to an English query, and compared to an English index of web pages. If there are more relevant results found among the web pages in the English language in this example, a list of relevant pages can be translated and provided to the user. In some implementations, a relevant web page can be translated and provided to the user based on the user selecting a web page from among the list of relevant pages. In some implementations, the list of relevant results can include both translated results and non-translated results.

Figure 1A:
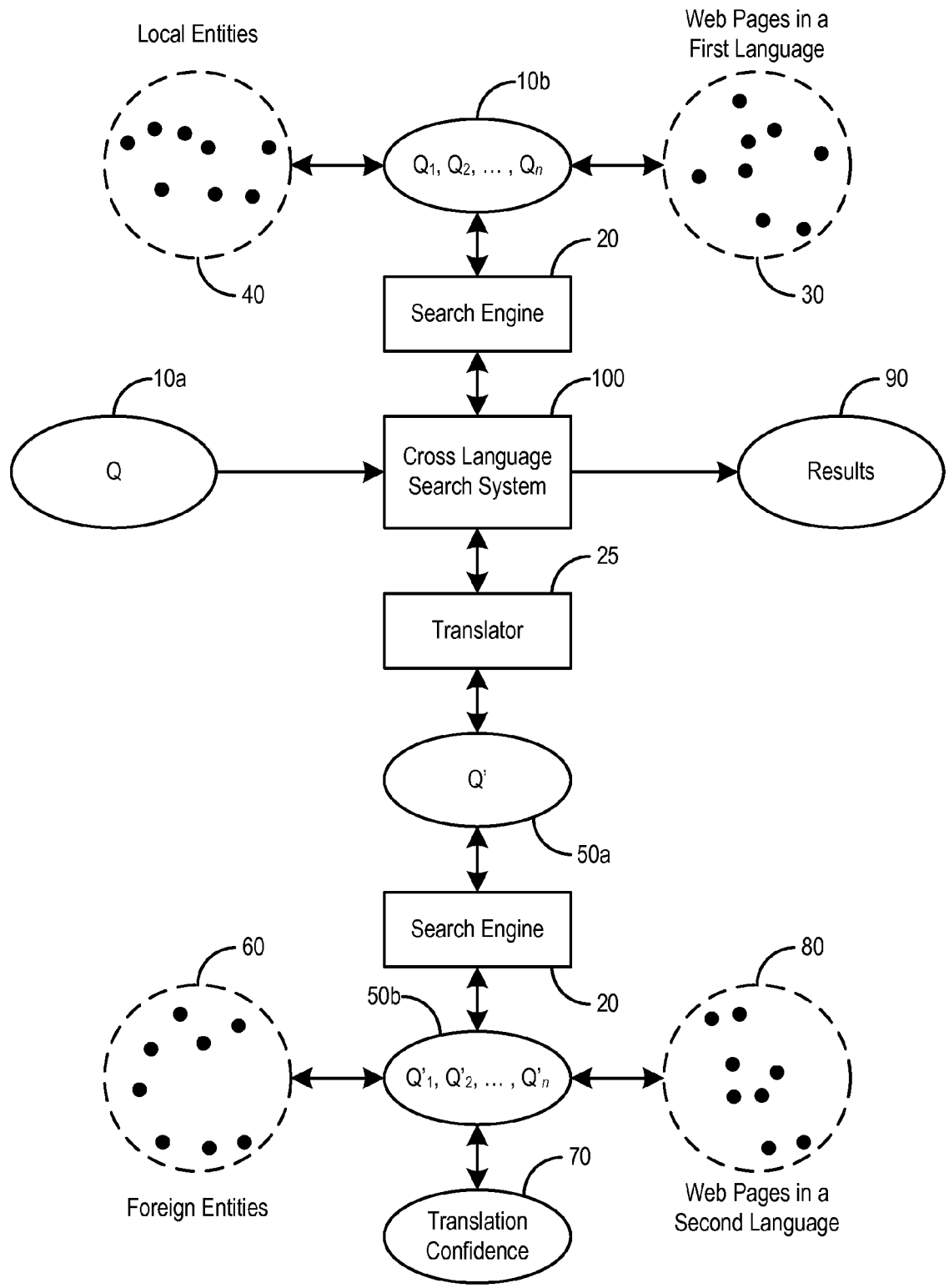
FIG. 1A is a block diagram depicting an architecture of a cross-language search system.

FIG. 1A is a block diagram depicting an architecture of a cross-language search system 100. The cross-language search system 100 can receive a search query (Q) 10a in a first language. In some implementations, the first language (e.g., the search language) can be identified based on an input mode associated with a client device. In other implementations, the first language can be identified based on a particular country code top-level domain being accessed. For example, Google, of Mountain View, Calif., provides many different web pages to many different countries, and the country code top-level domain can be used to identify from which language (or languages) the client expects to receive input. In such examples, if the user is accessing the "google.ru" country code top level domain, the client expects to receive input in Russian. In still further implementations, the user can specify the first language using the client. For example, the user can use a drop down menu to select one of a number of supported languages in which the user would like to enter the search query.

In some implementations, the cross-language search system 100 can send the search query to a search engine 20. The search engine 20 can receive queries and identify search results. For example, the search engine 20 can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

In some implementations, the search engine 20 can parse the search query (Q) 10a into component tokens ($Q_1$, $Q_2$, ..., $Q_n$) 10b. In some implementations, the tokens are words (or groups of words where the group of words forms a single idea, such as, e.g., "New York City") that form the query. The component token ($Q_1$, $Q_2$, ..., $Q_n$) 10b can be used to identify web pages in a first language that are relevant to the search query (Q) 10a. In some implementations, the relevant web pages are those in the first language that include more than one of the component tokens ($Q_1$, $Q_2$, ..., $Q_n$) 10b. Such pages can be found, for example, in an index of web pages that is limited to the first language 30. In some implementations, the search engine 20 can derive relevance scores associated with the most relevant pages. In further implementations, the search engine 20 can derive page rank scores associated with the quality of a web page as measured by the number of other sites linking to a page. The search engine 20 can also derive a score related to the search results (e.g., an information retrieval (IR) score). In some implementations, IR scores can be computed from, for example, dot products of feature vectors corresponding to a query and a document relevance, page rank scores, and/or combinations of IR scores and page rank scores, etc.

In some implementations, the cross-language search system 100 determines whether any of the component tokens ($Q_1$, $Q_2$, ..., $Q_n$) 10b are local entities 40 and excludes any search query (Q) 10a that includes a local entity from cross-language search. Entities are those words or word phrases that identify persons, places, or things. Local entities are those entities that are associated with the language in which the query is input, and the person, place or thing is indicative of a place of origin where the language is primarily spoken. There can be physical indications of places of origin in which the language is primarily spoken, logical indication of places of origin, or historical indications of places of origin. For example, the Eiffel Tower is located in France, and thus the query "la Tour Eiffel" is a local entity for the French language. In another example, The Continental Army has both a logical and historical indication of a place of origin in the United States and is thus a local entity for the English language. In further examples, the term "Москва́" is a local entity for the Russian language because it identifies Moscow, which is a city located in Russia.

Lists of such entities can be derived from encyclopedias, location servers, public filings, etc., or can be provided from third-parties. Lists of local entities typically exclude individual generic terms, even if a generic term is a constituent word in a brand name. However, a multi-word brand name that includes generic terms can be included in the list of local entities (e.g., "Auburn University").

Lists of local entities also typically exclude foreign entities from inclusion. In one implementations, foreign entities are those entities that are not local entities to the language used to enter the query. In other implementations, foreign entities can be entities and translations of those entities that are local to another language. An entity can be local to one language and foreign to another language. For example, the token "Vladimir Putin" defines a local entity to the Russian language, while the same token would define a foreign entity to the English language. Thus, if a Russian user entered "Vladimir Putin" (in Russian) as part of a search query 20a, the entity "Vladimir Putin" would be found in the local entities to the Russian language and the search can be excluded from performing a cross-language search. In another example, "Москва́" (e.g., "Moscow") is a local entity to the Russian language.

In some implementations, search queries that include a token that matches a local entity are not eligible for a cross-language search and the search can be served in the language used to submit the search query. For example, if a search "Al-Qahira" is received (e.g., correlating to an Egyptian entity "Cairo"), the search query can be served from an index of web pages in the Arabic language because the token "Al-Qahira" matches a local entity to the Arabic language. Thus, the web pages authored in Arabic can be assumed to be more relevant to the search query than web pages written in another language (e.g., the web pages resulting from the translated search query "Cairo" in English). Moreover, the web pages written in another language may be difficult to understand after translation. For example, web pages written in English that are translated to Arabic can be more difficult to read for native Arabic speakers than web pages that are written in Arabic.

In some implementations, the component tokens ($Q_1$, $Q_2$, ..., $Q_n$) 10b can be compared to the local entities 40 to determine the extent of any intersection of the set of component tokens ($Q_1$, $Q_2$, ..., $Q_n$) 10b with the collection of local entities 40. The extent of an intersection between the component tokens 10b and the collection of local entities 40 can be used to determine whether to perform a cross-language search.

In other implementations, subsets of the search query (e.g., ngrams) can be compared to the collection of local entities 40. In such implementations, the cross-language search system 100 can compare each of the subsets of the search query to the collection of local entities 40 to determine whether any of the subsets included in the search query match a local entity from the collection of local entities 60. For example, if the cross-language search system 100 received the search query "vacation homes finger lakes," the cross-language search system 100 could search the collection of local entities 40 for inclusion of any of the subsets: "vacation," "vacation homes," "vacation homes finger," "vacation homes finger lakes," "homes," "homes finger," "homes finger lakes," "finger," and "finger lakes." In some implementations, the cross-language search system 100 can stop searching an subpart string if the first word of the subpart string contains no matches in the collection of local entities 40. In additional implementations, the cross-language search system 100 can discontinue the search after finding a subset that matches an entity from the collection of local entities 40. For example, if the cross-language search system 100 received the query "Manhattan gourmet restaurants," the cross-language search system 100 might immediately find the term "Manhattan" as matching a local entity from the collection of local entities 40. Thus, searching for further matches can be considered unnecessary.

In those instances where a cross-language search is to be performed, the cross-language search system 100 can send the search query (Q) 10a to a translator 25. The translator 25 uses the search query (Q) 10a to derive a translated search query (Q') 50a in a second language. In some implementations, the translator can be an automated machine translator operable to receive a search query (Q) 10a in a first language and to output a translated query (Q') 50a in a second language.

The translated search query (Q') 50a can be divided into component tokens (Q'$_1$, Q'$_2$, ..., Q'$_n$) 50b by a search engine 20. In some implementations, the search engine 20 or the cross-language search system 100 can compare the component tokens (Q'$_1$, Q'$_2$, ..., Q'$_n$) 50b to a collection of foreign entities 60. The collection of foreign entities 60 can include those entities that are associated with the second language. For example, if the second language is Russian, the foreign entities could include locations (e.g., Red Square, the Kremlin, Moscow, or Siberia), as well as people (e.g., Lenin, Stalin, Gorbachev, or Yeltsin), or Russian brand names, products and companies associated with the Russian language. In those instances where the set of component tokens in the second language (Q'$_1$, Q'$_2$, ..., Q'$_n$) 50b includes some intersection with foreign entities 60, the translated query (Q') 50a can be considered a good candidate to perform a cross-language search. In other implementations, the translated query (Q') can be separated into subsets and compared to the entities in the collection of foreign entities 60 to determine whether a term included in the search query matches a foreign entity.

In further implementations, the translator can produce a translation confidence score 70 associated with the translated search query (Q') 50a. The translation confidence score 70 associated with the translated query (Q') 50a can be used to determine whether the translation is likely to produce relevant results. In such implementations, the translation confidence 70 can be compared to a translation confidence threshold to determine whether the translated query (Q') 50a is a candidate for the cross-language search. For example, a search query (Q) 10a can have potentially a hundred or more translations. A greater number of potential translations can produce greater uncertainty with regard to a translated search query (Q') chosen from the possible translations. Thus, there is some likelihood that the chosen translation is incorrect, and that any results generated using such a search query would be irrelevant to the original search query 10a. Translated search queries (Q') 50a whose translation confidence scores 70 do not meet a translation confidence threshold can therefore be considered poor candidates for performing a cross-language search.

In some implementations, the translator 25 can provide multiple translations to the search engine 20, based on multiple translations exceeding a translation confidence threshold. In other implementations, the translator 25 can provide a single translation (e.g., the translated search query (Q') 50a) to the cross-language search system 100, and the cross-language system can determine whether the translation confidence scores associated with that translated search query (Q') 50a meet a translation confidence threshold. Translated search queries (Q') 50a that do not meet the translation confidence threshold are excluded from cross-language search.

If the translated search query (Q') meets the confidence threshold, the translated search query (Q') 50a can be sent to a search engine 20 to search for documents (e.g., web pages) relevant to the translated search query (Q') 50a. The search engine 20 can use component tokens (Q'$_1$, Q'$_2$, ..., Q'$_n$) 50b of the translated search query (Q') 50a to find relevant web pages in the second language 80. As described previously, the search engine 20 can provide the cross-language search system 100 with IR scores associated with the relevant web pages in the second language 80.

In some implementations, the respective relevance scores associated with the results of the translated search query (Q') 50a can be compared to a relevancy score threshold to determine whether to serve a translated web page as a result to the search query (Q) 20a. For example, in some instances the results of the translated query (Q') 50a might have such low relevance scores that they will not be served to the searcher, even if the results of the translated search query (Q') 50a have a higher relevance scores than the results of the search query (Q) 20a.

In some implementations, the relevance scores for the results of the translated search query (Q') 50a can be compared to the relevance scores for the results of the search query (Q) 10a. The more relevant results can be served to the user as results 90. In those instances in which the results of the translated search query (Q') 50a have a higher relevance score than the relevance score of the results of the search query (Q) 10a, the relevant web pages in the second language can be translated into the first language and served as results 90. In some implementations, the relevance scores can be biased to favor the results from the search query (Q) 10a based on the likelihood that a translated web page is more difficult to read than a web page originally authored in the first language.

In some implementations, a translated web page result of the translated search query can include a translation confidence score. In such implementations, the translation confidence score or quality associated with the translation of a translated web page can be compared to a translation confidence threshold to determine whether a translated web page should be served as a result 90 to the search query 10a. For example, in some instances it may be determined that a translation of a relevant web page or an associated portion or snippet in the second language would be practically unreadable to the searcher. In such examples, the cross-language search system 100 might serve only those results which are more relevant than local results and meet the translation confidence threshold.

Figure 1B:
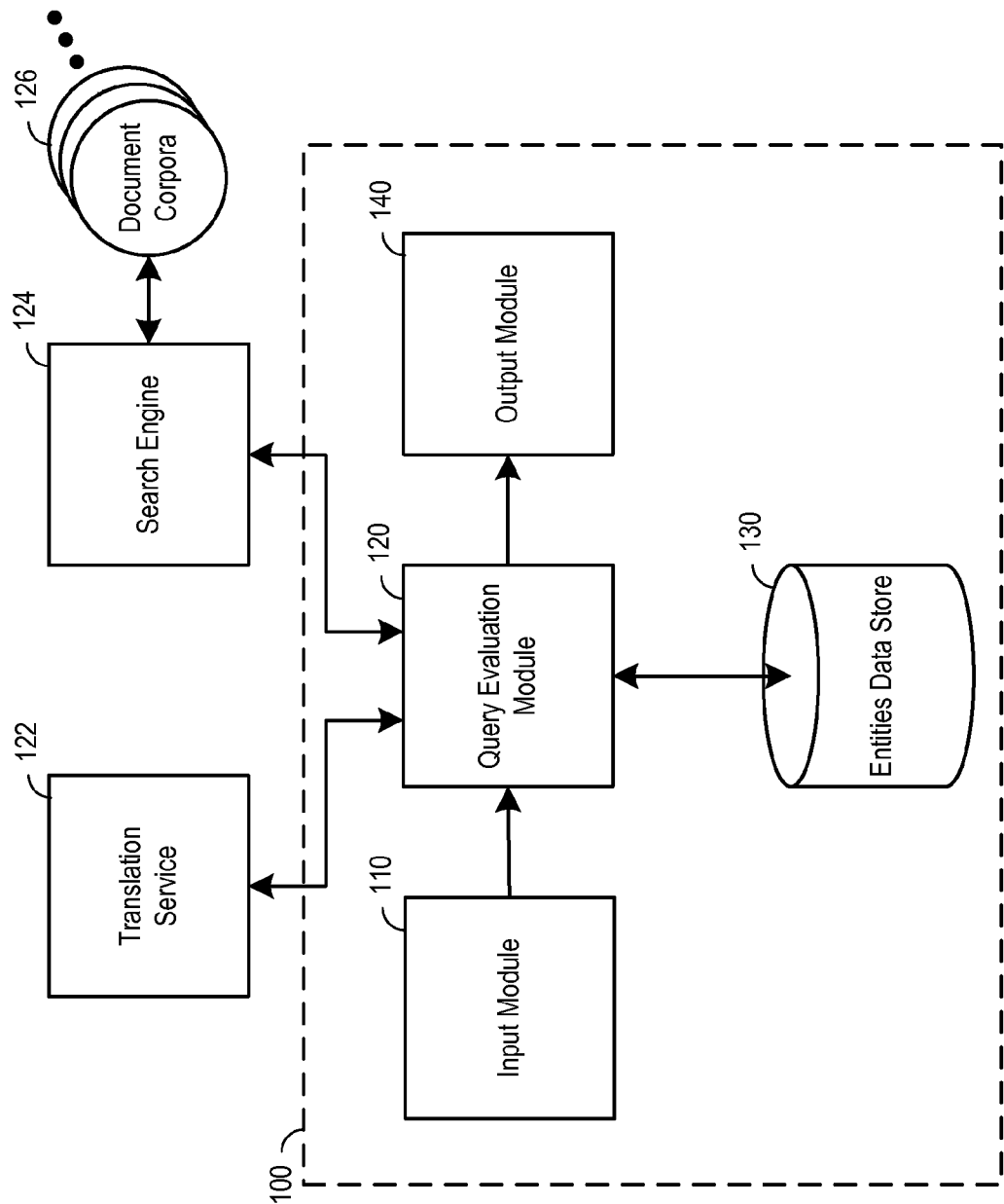
FIG. 1B is a block diagram illustrating an example cross-language search system.

FIG. 1B is a block diagram illustrating an example cross-language search system 100. In some implementations, the system 100 can include an input module 110, a query evaluation module 120, an entities data store 130 and an output module 140. The input module 110 can receive a search query from a client device. In some implementations, the input module 110 can include search engine web page code that is provided to a user device, e.g., a computer device, and which renders a web page on the user device that enables the user to input a search query. In other implementations, the input module 110 can include a communications interface enabling the system to receive a query from a client device.

In some implementations, the query evaluation module 120 can receive the search query from the input module 110 and can evaluate the search query to determine whether the search query is a candidate for performing a cross-language search. In these implementations, the query evaluation module 120 can filter the search queries to identify those queries that are more likely to have more relevant results from web pages in another language than would be found on web pages authored in the language used to input the query.

In some implementations, the query evaluation module 120 can communicated with a translation service 122. The translation service 122 can receive a search query in a first language and can translate the search query into a second language and generate a translation confidence score associated with the translated search query. The translated search query and the translation confidence score can be provided to the query evaluation module 120.

In some implementations, tokens from the search query that match entities (e.g., local entities) associated with the first language (e.g., search query language) can be identified by the query evaluation module 120 in conjunction with the entities data store 130. In some implementations, local entities can be proper nouns (e.g., cities, places, etc.) that are associated with an area local to the language used to enter the search query.

In other implementations, search queries that include a token that matches a local entity can nevertheless be eligible for cross-language search based on the relevance of web pages in the first language. In such implementations, when a search query includes a token that matches a local entity, the results associated with the local entity in the language of the query can be compared to a threshold relevancy score to determine whether the results in the first language are of poor quality. For example, a search query might include a token that matches a local entity; however, web pages in the language associated with that local entity might be sparse. Thus, it can be useful to determine whether web pages in another language might have more relevant results.

In some implementations, the cross-language search system 100 can identify when a token from a translated search query matches a foreign entity. A foreign entity is any entity associated with language other than the first language (e.g., "Cairo, Egypt" is a foreign entity to the English language). In some examples, an encyclopedia for the first or second language can be used to determine whether the translated query would be a good candidate for a cross-language search. In these examples, the tokens included in a search query or a translated search query that match an entity (e.g., local or foreign) can be identified using an encyclopedia website associated with the first language or the second language, respectively. In other examples, location servers can be used to identify locations associated with the search query or the translated search query.

In compiling the entities data store 130, in some implementations, generic words can be identified and removed from the entities data store 130, even where the words represent brands or cities associated with the first or second language. Generic words, for example, are those words that do not have any particular association with that language. An example, of a generic word that also has a city or brand associated with it is "auburn." In some instances, "auburn" generically refers to a color, in other instances it could refer to the city of Auburn, Ala., or the brand "Auburn University." In another example, the term "apple" can generically refer to the fruit, while in other instances it could refer to a company. These words are removed from the entities data store 130 because they can lead to irrelevant results if the user is attempting to enter the generic term instead of the city or brand.

In some implementations, the query evaluation module 120 can retrieve historical statistics related to entities included in the encyclopedia. Based on the statistics associated with the entities, the query evaluation module 120 can determine a frequency associated with an entity's inclusion in previously received search queries. For example, the more frequently an entity appears in a search query, the more popular a topic related to that entity. More popular topics are more likely to have relevant web pages associated with the topics because interest as indicated by user queries is often mirrored by interest from publishers. Moreover, when there is no relevant content for a query, that query can become unpopular because it does not result in relevant results. Entities that are queried with a threshold frequency can be included in the entities data store 130, because such entities can be assumed to have a relevant topic corpus in associated web pages.

In yet further implementations, query evaluation module 120 can determine a quality of translation of the search query. The quality of the translation can be used to determine whether the search query is a good candidate for cross-language searching. For example, if a translation is poor, e.g., a translation confidence indicates that the translation has relatively a high probability of being incorrect, then the results from the poorly translated query might also be poor, or may not be at all relevant to the original search query. Various translation services provide confidence scores for a translation to determine which word is most likely to be implicated by usage. In some implementations, the translation service can provide a confidence score for the overall translation of the search query based on a confidence associated with the translation of each word in the search query. Thus, a search query might be difficult to translate accurately, and a confidence value or quality value can be used to filter search queries that use such words from being used for cross-language searches. For example, a particular word might have multiple translations into a foreign language or might have no translation at all. Such words would be difficult to translate, and result in a lower confidence score related to the translation.

In some implementations, the translated search query can be tested to determine whether the translated search query results in relevant web page matches. In such implementations, the query evaluation module 120 can send the translated search query to a search engine 124. The search engine 124 can use the translated search query to identify relevant documents in document corpora 126 (e.g., a index in the second language). The identified documents and the translated search query can be used to derive relevance scores associated with results of the translated search query. In some implementations, the relevance score can include both a relevance component and a quality component. Upon receiving a relevance score associated with the results from a translated search query received from the search engine 124, the query evaluation module 120 can compare the relevance score associated with the results of the search query to a relevance threshold to determine whether or not the translated search query is likely to be relevant to the search query. For example, in some instances, the results from the translated search query might be so irrelevant that the results are not even offered to the searcher.

In further implementations, the activity of users with respect to the results of previous queries matching the translated query can be used to determine whether the results from similar queries were satisfactory to other users, thereby indicating that similar search queries have produced relevant results. For example, the search engine 124 can log when the client device requests a result, e.g., clicks on a search result and fetches a landing page associated with the result. If the client device returns to the search page to enter a new query immediately after visiting the landing page, it is likely that the results were not relevant. Conversely, if the client device dwells on one or more of the result pages for a period of time, it is more likely that the results were relevant to the search query. The query evaluation module 120 can thus determine whether the translated search query is likely to yield quality results based on the activity by other users that used a search query that matched the translated query.

In further implementations, the query evaluation module 120 can determine whether the search query in the first language has more relevant results than the translated search query in a second language. In such implementations, the query evaluation module 120 can send both the search query and the translated search query to a search engine 124. The search engine 124 can derive first set of relevance scores associated with a first set of results from the original search query, and a second set of relevance scores associated with the second set of results from the translated search query. In some implementations, if the search query yields better results than any of the results from the translated search query as indicated by the first and second relevance scores, respectively, the results from the search query can be served to the searcher. Alternatively, if the results from the translated search query are more relevant than the results from the search query as indicated by the respective relevance scores, the results from the translated search query can be served to the searcher. Such a comparison assumes that the relevance measures for different languages are commensurable across the respective corpora.

In some implementations, a web page (or multiple web pages) in a second language can be translated to produce a translated version of the web page in a first language. The translated version of the web page(s) in the first language, for example, can be compared to the search query in the first language to derive a relevance score. For example, a search query received in Spanish can be translated to English. If a highest ranked English web page is more relevant to the translated English query than a highest ranked Spanish web page is to the Spanish query, the English web page can be translated into Spanish. In this example, after the English web page is translated into Spanish, the Spanish query can be compared to the translated English web page. If the translated English web page is still more relevant to the Spanish query than the Spanish web page is to the Spanish query, the translated English web page can be provided as a result. If the translated English web page is not more relevant to the Spanish query than the Spanish web page is to the Spanish query, the Spanish web page can be provided to the search as a result. Thus, the relevance score of a translated search page to the original query can be compared to the relevance score of a web page written in the first language to the original search query.

In some implementations, the results served to the client device can include both translated web pages and web pages written in the first language based on the relevance scores associated with the respective results. For example, if the results from an English query have relevance scores of 10, 9, and 2, while the results from a Spanish query have relevance scores of 8, 8 and 6, the cross-language search system could provide the two most relevant results from the English query, followed by the results of the Spanish query, and ending with the least relevant result from the English query. In other implementations, the relevance scores of the results of the original search query can be aggregated to produce a first aggregate relevance score and the relevance score of the original search query can be aggregated to produce a second aggregate relevance score. In some implementations, the aggregation can include summing the respective relevance scores to produce the first and second aggregate relevance score. The first aggregate relevance score can be compared to the second aggregate relevance score to determine whether to serve the results associated with the translated search query.

The output module 140 is operable to receive the results from the query evaluation module 120 and serve the results to a client device. In some implementations, the output module 140 can assemble a web page containing search results for transmission to a client device. In other implementations, the output module 140 can serve the results to another module operable to format and transmit the results to a client device.

Figure 1C:
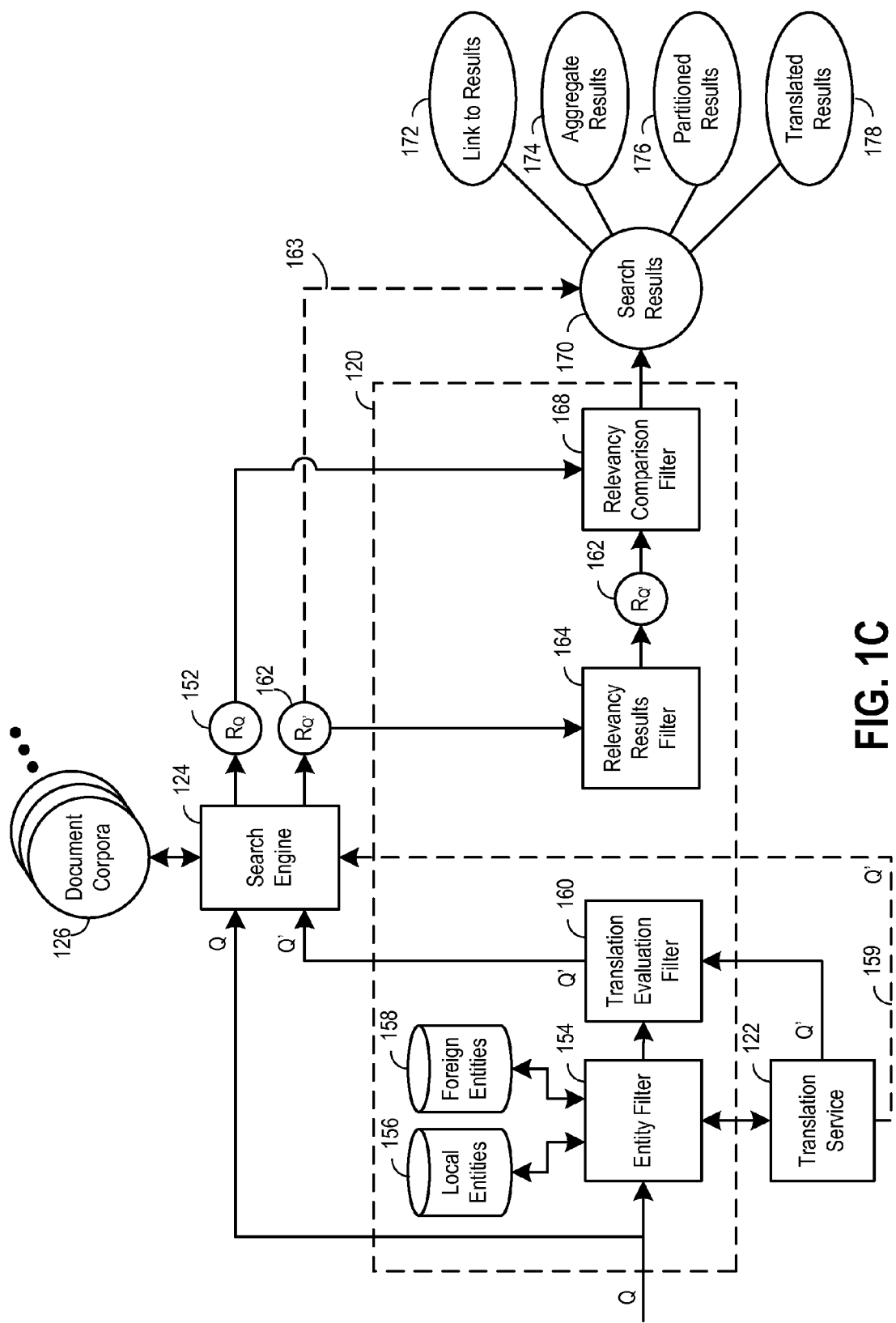
FIG. 1C is a block diagram illustrating an example implementation of the query evaluation module.

FIG. 1C is a block diagram illustrating an example implementation of the query evaluation module 120. The query evaluation module 120 can receive a search query (Q) in a first language. The query evaluation module 120 can send the search query (Q) to a search engine 124. The search engine 124 can perform a search of document corpora 126 associated with the first language and based on the search query (Q) to produce a set of search results ($R_Q$).

The query evaluation module 120 can also provide the received search query to an entity filter 154. The entity filter 154 can compare the tokens (e.g., words, or groups of words that form a single concept) to entities in a local entities data store 156 and to entities in a foreign entities data store 158. If the entity filter 154 determines that the search query (Q) includes a token that matches an entity from the local entities data store 156, the query evaluation module 120 can determine that the search query (Q) is not eligible for cross-language search. Accordingly, only the set of search results ($R_Q$) 152 is served to the searcher.

If the search query (Q) does not include a token that matches an entity from the local entities data store 156, tokens from the search query (Q) can be compared to a list of foreign entities in a foreign entities data store 158. If the entity filter 154 determines that the search query (Q) includes a token that matches a foreign entity, the query evaluation module 120 can respond to the received search query (Q) with results from a translated search query (Q') 162 using a translation service 122 and the search engine 124 as indicated by paths 159 and 163, thereby avoiding further evaluation by the query evaluation filter 120. However, if the entity filter 154 determines that the search query (Q) does not include a token that matches a foreign entity from the foreign entities data store 158, the entity filter 154 can determine that the query should undergo further evaluation and instruct the translation service 122 to translate the search query (Q) to produce a translated search query (Q').

While this application describes a list of local entities that is derived from an encyclopedias and other reference sources and excludes certain generic terms and terms that are local to other languages, the list of local entities and list(s) of foreign entities, in some implementations, can be generated by another system and can be provided to the cross-language search system for use in determining whether a search term includes a token that matches a local or foreign entity from the lists provided by such other system(s).

A translation evaluation filter 160 can receive the translated search query (Q') from the translation service 122. The translation evaluation filter 160 can also receive a translation confidence score from the translation service 122. The translation evaluation filter 160 can compare the translation confidence score from the translation service 122 to a threshold confidence score to determine whether the translation is of high enough quality to be a good candidate for performing a cross-language search. If the translated search query (Q') meets the confidence threshold, the translation evaluation filter 160 can transmit the translated search query (Q') to a search engine 124. In some implementations, the most likely translation of the original search query can be returned to the query evaluation module 120, and a translation confidence score associated with this translation can be compared to the translation confidence threshold. In other implementations, all translations of the original search query that exceed the translation confidence threshold can be returned to the query evaluation module 120.

The search engine 124 can perform a search of document corpora 126 associated with the second language and based on the translated search query (Q') produce a set of search results ($R_{Q'}$) 162 in the second language. The search engine 124 can provide the results ($R_{Q'}$) 162 of the translated search query (Q') to a relevancy results filter 164. The search engine 124 can also provide a relevancy score (e.g., IR score) associated with the results ($R_{Q'}$) 162 of the translated search query (Q') to the relevancy results filter 164.

The relevancy results filter 164 can determine whether the results ($R_{Q'}$) 162 of the translated search query (Q') are relevant enough to be served to a searcher. The relevancy results filter 164 can compare the results ($R_{Q'}$) 162 of the translated search query (Q') to a threshold relevancy to ensure that the results ($R_{Q'}$) 162 of the translated search query (Q') are relevant enough to be served to the searcher. In other examples, the relevancy results filter 164 can retrieve statistics associated with the translated search query (Q') and determine the relevancy of the results based on click analysis associated with the results ($R_{Q'}$) 162. In those instances where the results ($R_{Q'}$) 162 are determined not to meet a threshold relevancy, only the results ($R_Q$) 152 of the original query (Q) are served to the searcher. If the results ($R_{Q'}$) 162 of the translated search query (Q') are determined to meet a threshold relevancy, the results ($R_{Q'}$) 162 of the translated search query (Q') are provided to a relevancy comparison filter 168.

The relevancy comparison filter 168 can receive the results ($R_Q$) 152 of the original search query (Q) and the results ($R_{Q'}$) 162 of the translated search query (Q'). The relevancy comparison filter 168 can also receive first relevancy scores (e.g., IR score) of the results ($R_Q$) 152 of the original search query (Q) and second relevancy scores of the results ($R_{Q'}$) 162 of the translated search query (Q'). The relevancy comparison filter 168 can compare the first and second relevancy scores to determine whether to serve the results ($R_Q$) 152 of the original search query and/or the results ($R_{Q'}$) 162 of the translated search query. For example, if the results ($R_{Q'}$) 162 of a translated search query (Q') have a higher aggregate relevance score than the results ($R_Q$) 152 of the original search query, the results ($R_{Q'}$) 162 of the translated search query can be offered as search results 170 to the searcher. Otherwise, the results ($R_Q$) 152 of the original search query are served as search results 170 to the user. Other serving schemes based on relevancy can also be used.

The search results 170 can be served to the client in a variety of ways. In some implementations, the search results 170 can include links to an alternative result page (e.g., including translated web page results) identified by the query evaluation module 120 if a cross-language search has been performed by the query evaluation module 120. In other implementations, the search results 170 can include an aggregation of the results identified by the query evaluation module 120. For example, the search results 170 can include both results ($R_Q$) 152 of the original search query (Q) and results ($R_{Q'}$) 162 of the translated search query (Q'). In still other implementations, the search results 170 can include partitioned results 176. For example, the search results 170 can include only results ($R_Q$) 152 of the original search query or results ($R_{Q'}$) 162 of the translated search query, or a link to one set of results from a page presenting the other. In yet further implementations, the search results 170 can include translated results 178. For example, if the search results 170 include results ($R_{Q'}$) 162 of the translated query, the results ($R_{Q'}$) can be translated before presentation to the searcher.

Figure 2:
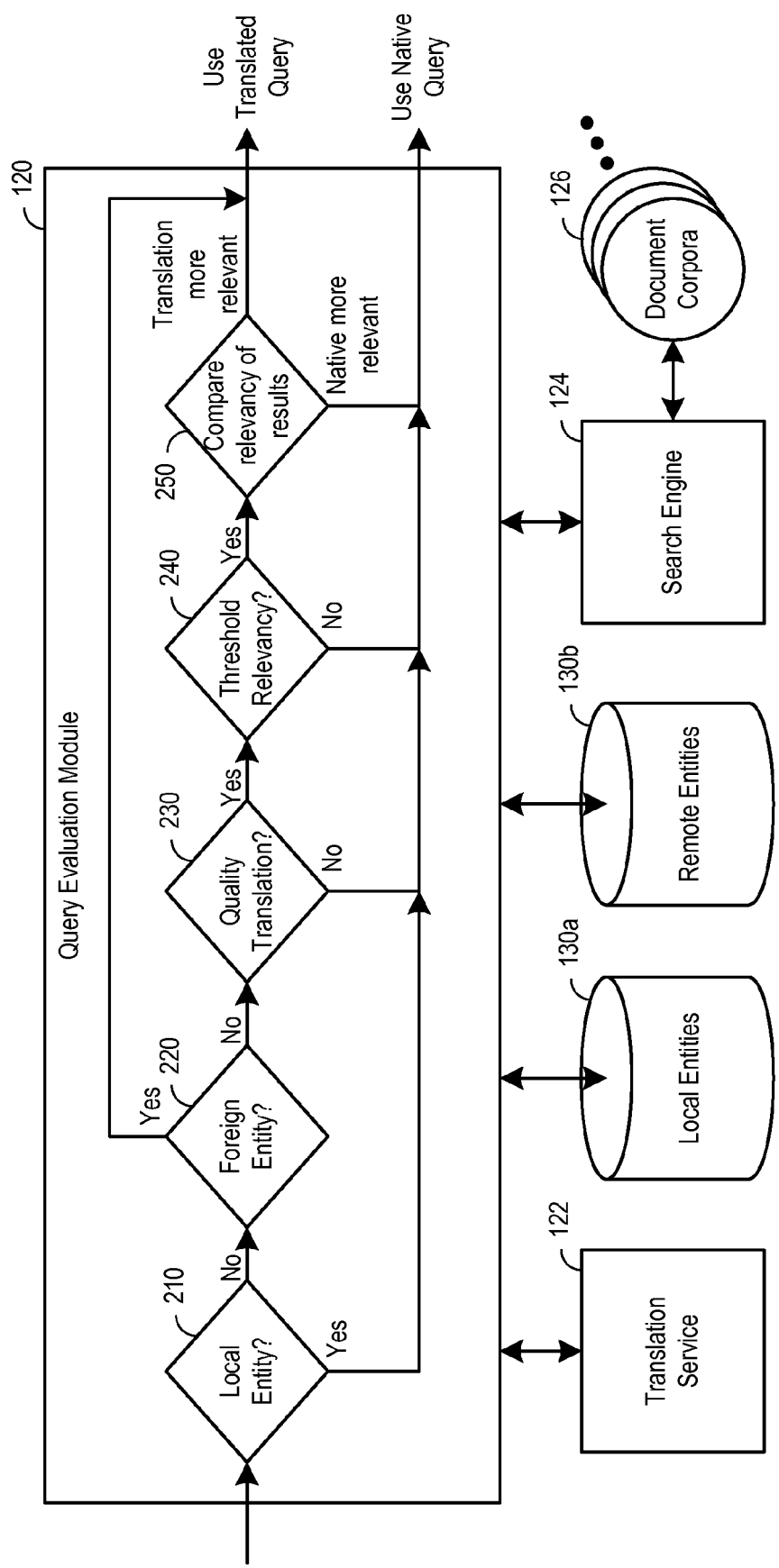
FIG. 2 is a block diagram illustrating a query evaluation module.

FIG. 2 is a block diagram illustrating a query evaluation module 120. In some implementations, the query evaluation module 120 can include a local entity filter 210. The local entity filter 210 can determine whether the search query is related to a local entity. The local entity filter 210 can compare tokens included in the search query to a local entities data store 130a to determined whether the search query is related to a local entity (e.g., includes a token that matches a local entity). In those instances that the search query is related to a local entity, it is likely that the results from the web pages written in the first language will be relevant to the search query. In such instances, the query evaluation module 120 can exclude the search query from a cross-language search.

In some implementations, the query evaluation module 120 can include a foreign entity filter 220. The foreign entity filter 220 can determine whether the search query or translated search query is related to a foreign entity (e.g., includes a token that matches a foreign entity). In some implementations, the foreign entity filter 220 can include a database of foreign entities, against which the tokens associated with the search query or the translated query can be compared. In those instances when the search query is related to a foreign entity (e.g., includes a token that matches a foreign entity), it is likely that the results from the web pages written in the second language will be relevant to the search query. In such instances, the query evaluation module 120 can serve the search results based on search engine results 124 from a translated search query associated with the original search query.

In some examples, the local entities data store 130a and the foreign entities data store 130b can be compiled to include proper nouns associated with a first language (e.g., the query language) or second language (e.g., the translated query language), respectively. For example, the local entities and foreign entities can include brand names used in the respective languages, locations associated with the languages, celebrities, television shows, products, etc. Such entities can be presumed to have better results in their respective language than they do in another language. In some implementations, the local entities data store 130a and the foreign entities data store 130b can be compiled, for example, using encyclopedias (e.g., electronic encyclopedias) and/or location servers, such as those used to provide maps. In some implementations, generic terms and/or locations local to the language used to submit the query can be removed from the local entities data store 130a and/or the foreign entities data store 130b.

In some implementations, the foreign and local entities included in the database can be compared to query statistics (e.g., how many times the entity has previously been queried) to ensure that each foreign or local entity from the encyclopedia should be included in the list of entities. For example, an entity that has not appeared in many previous queries would probably not result in relevant web pages being found based on the implication that if no searchers are interested in the entity, there are likewise few publishers interested in the entity. Alternatively, the fact that an entity has not appeared in many previous queries can be an indication that the entity is a spelling or grammar mistake, and should be eliminated from consideration.

In some implementations, the query evaluation module 120 can be coupled to a translation service 122. The translation service 122, in some examples, can receive a search query and translate the search query to produce a translated search query. In some implementations, the translation service 122 can also produce a confidence value associated with the translated query. The confidence value, for example, can provide a confidence associated with a translation of the search query.

In some implementations, the query evaluation module 120 can include a translation quality filter 230. The translation quality filter 230 can determine the likelihood of whether a translated search query has been accurately translated. For example, if a word in a first language (e.g., the query language) has many translations in a second language, it can be difficult to determine which of the multiple words is the proper word to use in the translation. The more potential translations associated with a word, the less likely that the chosen translation is correct. Thus, in those instances where the translated web query does not meet a confidence/quality threshold, the translation quality filter 230 can determine that the translated search query received from the translation service 122 will not result in relevant results to the original query. In such instances, the query evaluation module 120 can exclude the translated search query from eligibility for the cross-language search and serve the results to the original search query.

In some implementations, the query evaluation module 120 can include a threshold relevancy filter 240. The threshold relevancy filter 240 can send the translated search query to a search engine 124. The search engine can identify relevant web pages from a document corpora 126 and provide the relevant web pages and a relevancy score associated with relevant web pages. The threshold relevancy filter 240 can compare the relevancy score of the results received from the search engine 124 associated with the translated search query to a threshold relevancy score to determine whether or not the translated search query produces results that are relevant enough to be served to the user. For example, a user might enter a German search query. The German search query can be translated to produce an English search query. The English search query can be used to identify English web pages related to the English search query based on a relevance score associated with each of the English web pages. The relevance score of the English web pages can be compared to a threshold relevance score to determine whether the English web pages are relevant enough to be returned to the searcher. For example, if the English pages are relatively irrelevant, the English pages would not be translated for presentation as a result of the German search query. In those instances where the relevance scores associated with English web pages do not meet a threshold relevance score, German web pages that result from the German search query can be served to the searcher.

In some implementations, the query evaluation module 120 can include a relevancy comparison filter 250. The relevancy comparison filter 250 transmit the original search query and the translated query to a search engine 124. The search engine 124 can identify relevant web pages from a document corpora 126 and provide the relevant web pages to the search query and translated search query. The search engine 124 can also provide first relevancy scores associated with relevant web pages to the original search query and second relevancy scores associated with relevant web pages to the translated search query. In some implementations, the relevancy comparison filter 250 can compare the first relevancy scores to the second relevancy scores. If the second relevancy scores are higher than the first relevancy scores, the translated search query can be used. Otherwise, the original search query can be used. In some implementations, the second relevancy scores associated with the results from the translated search query can be discounted. For example, a web page in English could be translated to German, but it would probably be difficult to read. Thus, in these implementations, a readability factor associated with the translated web pages can be considered in the comparison, thereby favoring web pages in the language in which the search query was submitted.

In some implementations, such as shown in FIG. 2, each of the filters must be satisfied for a search query to be eligible for cross-language searching. In other implementations, any of the filters may be satisfied for the search query to be eligible for cross-language searching.

Other implementations in addition to the implementations of FIGS. 1A-C and 2 can also be used to facilitate cross-language searching. For example, FIGS. 3-7 outline different implementations in which only a single filter can be included in the query evaluation module. Combinations of any subset of the filters can also be used.

Figure 3:
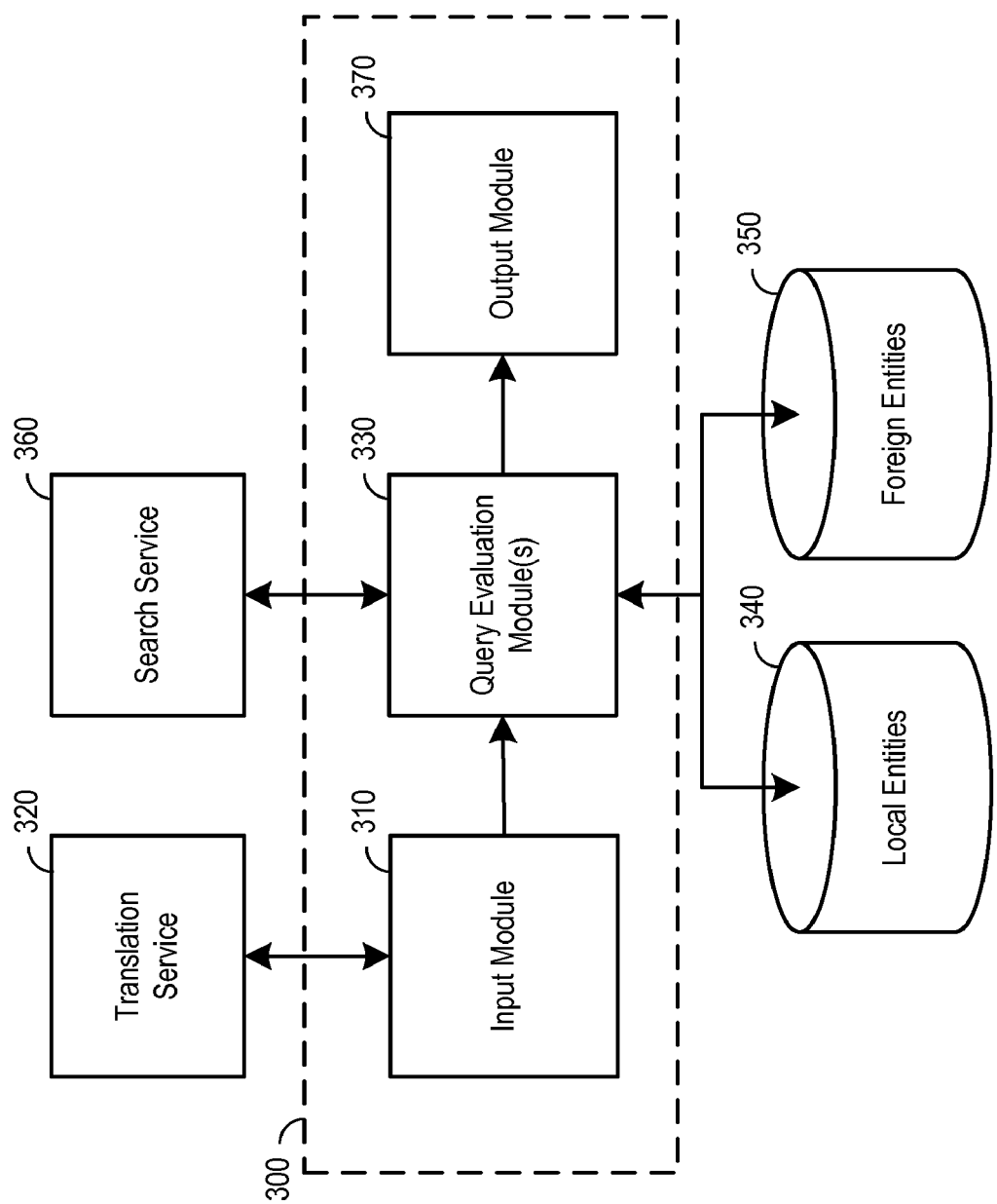
FIG. 3 is a block diagram illustrating another example cross-language search system.

FIG. 3 is a block diagram illustrating another example cross-language searching system 300. In the implementation of FIG. 3, entities databases 340, 350 can be provided by a system remote to the cross-language searching system 300. The cross-language searching system 300 can include an input module 310. The input module 310 can be operable to receive a search query. In some implementations, the input module 310 can receive the search query from a client device. In other implementations, the input module 310 can receive the search query through a search engine interface.

The cross-language searching system 300 communicates with a translation service 320. The translation service 320 can receive the search query from the input module 310. In some implementations, the translation service 320 can translate the search query from a first language to produce a translated search query in a second language. In some implementations, the translation module can translate the search query to produce multiple translated search queries that can be used to perform a cross-language search. In some implementations, the translation module 320 can also produce a translation confidence score associated with the translation. The translation confidence score can identify a confidence associated with the translated search query.

In some implementations, the cross-language searching system can include a query evaluation module 330. The query evaluation module 330 can evaluate the search query to determine whether the search query is a candidate for performing a cross-language search. In some implementations, the query evaluation module can identify those queries that would result in relevant results when translated to language. For example, the query evaluation module 330 can compare a confidence score associated with the translation to a threshold confidence score. In such examples, the query evaluation module 330 can exclude translated search queries with confidence scores below the threshold from cross-language searching, because translated search queries whose translation confidence scores below a threshold will likely not result in relevant results.

In other examples, the query evaluation module 330 can determine whether the translated search query is associated with an entity (or entities) that are local to the language associated with the translated search query. In such examples, a user might enter "Al Qahira," and the query evaluation module can determine that "Al Qahira" is a local entity to the Arabic language. Thus, the query evaluation module can determine that results in Arabic are likely to be more relevant to the search query than results from English web pages.

In still further examples, the query evaluation module 330 can determine if the results from the translated search query meet a minimum relevance threshold. In such examples, the query evaluation module 330 can transmit the translated search query to a search service 360. The search service 360 can provide the query evaluation module 330 with results relevant to the translated search query and a relevance score associated with results from the translated search query.

In some examples, the query evaluation module 330 can transmit the original search query and a translated search query to a search service 360. The search service 360 can provide a first set of results relevant to the original search query and a second set of results relevant to the translated search query to the query evaluation module 360. The search service 360 can also provide first relevance scores associated with the first set of results and second relevance scores associated with the second set of results. The query evaluation module can determine if the first relevance scores are higher than the second relevance scores. In some implementations, the first relevance scores and second relevance scores can be computed similarly, such that the scores from similarly relative results in separate languages are comparable. In other implementations, the first relevance scores or second relevance scores can undergo a transformation to a universal relevance scale.

Figure 4:
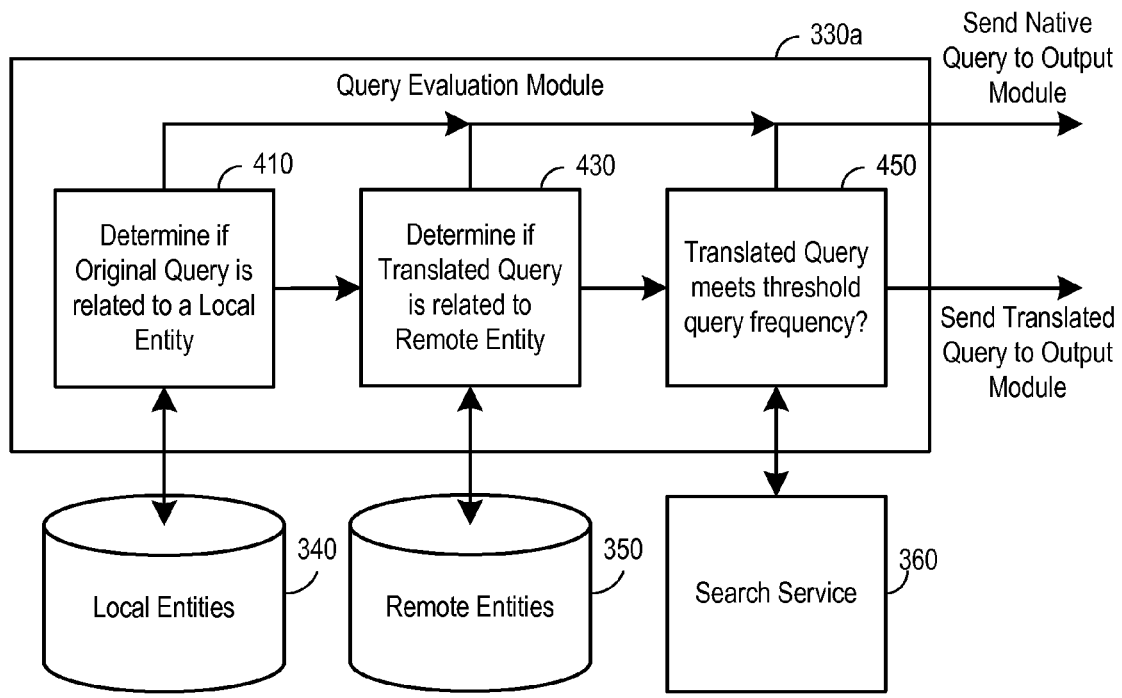
FIGS. 4-7 are block diagrams illustrating some implementations of an evaluation module.

FIG. 4 is a block diagram illustrating an implementation of a query evaluation module 330a. In some implementations, the query evaluation module 330a can include a local entity filter module 410 operable to determine whether the original search query is related to an entity local to the language of the original search query. In these implementations, the local entity filter module 410 can determine whether any of the tokens included in the original search query match any entities included in a local entities data store 340. If one or more of the tokens of the search query are local to the language of the original search query, the query evaluation module can send the original search query (and/or results from the original search query) to an output module (e.g., output module 370 of FIG. 3).

Alternatively, if the tokens of the original search query are not local to the language of the original search query, the query evaluation module, in some implementations, can include a foreign entities filter module 430. The foreign entities filter module 430 can determine if the search query is related to a foreign entity (e.g., an entity foreign to the language of the original search query). For example, if a searcher entered the equivalent of "Yankee Stadium" in Arabic, it can be assumed that the results from English web pages would be more relevant to the search query than results from Arabic web pages. In these implementations, the foreign entities filter module 430 can identify whether any of the tokens included in the search query match any of the entities included in a foreign entities data store 350. In some implementations, if the search query is not related to any of the foreign entities included in the foreign entities database 440, the original search query can be transmitted to an output module (e.g., output module 370 of FIG. 3). In other implementations, if the search query is not related to any of the local entities 340 and the search query is not related to any of the foreign entities 350, the query evaluation module 330 can perform further evaluation of the search query and/or translated search query.

In some implementations, when the search query is associated with one of the foreign entities 350, the query evaluation module 330a can include a query frequency module 450 operable to determine whether the translated search query is used frequently enough that it is likely to produce relevant results. For example, if a translated search query is not used with some frequency, it is likely that there is not much interest in the subject by either searchers or publishers. Thus, it is likely that there are not many web pages relevant to the translated search query, and the translated search query would be unlikely to yield better results than the original search query. In some implementations, the query frequency module 450 can derive the popularity of a search query based on query statistics retrieved from the search service 360. The query statistics can include the number of times that the search query has previously been issued by clients. If the query statistics associated with the translated search query meet a threshold frequency, the translated search query can be sent to an output module (e.g., output module 370 of FIG. 3). If the query statistics associated with the translated search query do not meet a threshold frequency, the original search query can be sent to the output module. In other implementations, if a threshold frequency is not found by the query frequency module 450, the query evaluation module 330a can perform further evaluation of the search query and/or translated search query.

Figure 5:
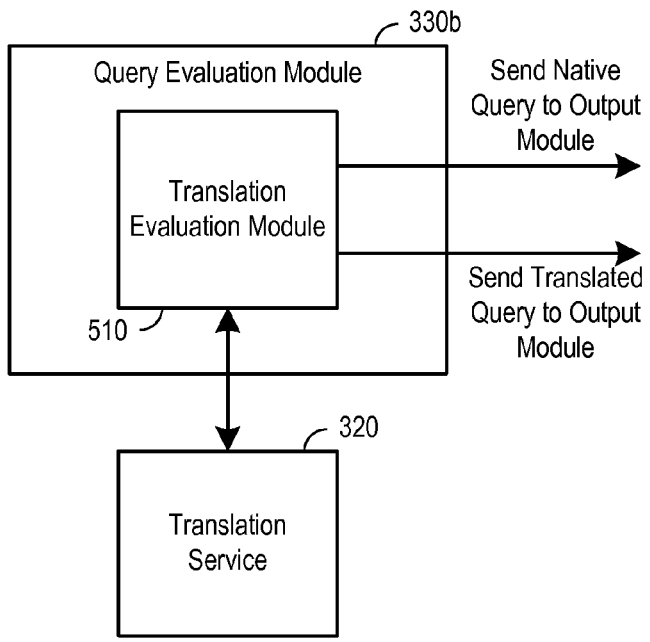

FIG. 5 is a block diagram illustrating an implementation of another query evaluation module 330b. In some implementations, the query evaluation module 330b can include a translation evaluation module 510. The translation evaluation module 510 can receive a confidence score associated with the translated search query from a translation service 320. The translation service 320 can derive a translation confidence score based on the confidence associated with the translation. The confidence can be based on a likelihood that the translation is correct, for example, based on a number of alternative translations available for the search query.

In some implementations, the translation evaluation module 510 can compare the confidence score associated with the translated search query to a threshold confidence score. In such implementations, the threshold confidence score can identify a minimum confidence associated with the translated search query that is likely to produce relevant results. If the translation confidence score is below the threshold confidence score, the original search query can be sent to an output module (e.g., output module 370 of FIG. 3). Otherwise the translated search query can be sent to the output module.

Figure 6:
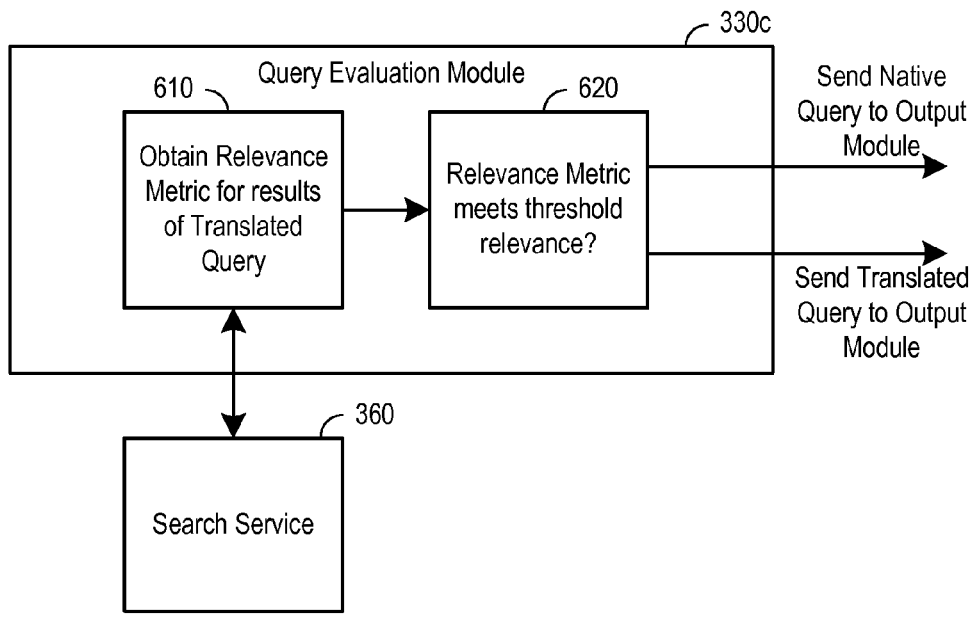

FIG. 6 is a block diagram illustrating an implementation of another query evaluation module 330c. In some implementations, the query evaluation module 330c can include a relevance module 610 operable transmit the translated search query to a search engine 360. The search engine 360 can derive relevance score associated with the results identifying web pages relevant to translated search query and provide the relevance scores of the results to the relevance module 610.

In some implementations, the query evaluation module 330c can include a comparison module 620 operable to compare the relevance score received from search engine 360 through the relevance module 610 to a threshold relevance score. The threshold relevance score can be a measure of the minimum relevance of a translated search query that is likely to produce results that would be of interest to a searcher. If the relevance score associated with the translated query is below the threshold relevance score, the query evaluation module 330c can send the original search query to an output module (e.g., output module 370 of FIG. 3). Alternatively, if the relevance score associated with the translated search query is above the threshold relevance score, the query evaluation module 330c can send the translated search query to the output module.

Figure 7:
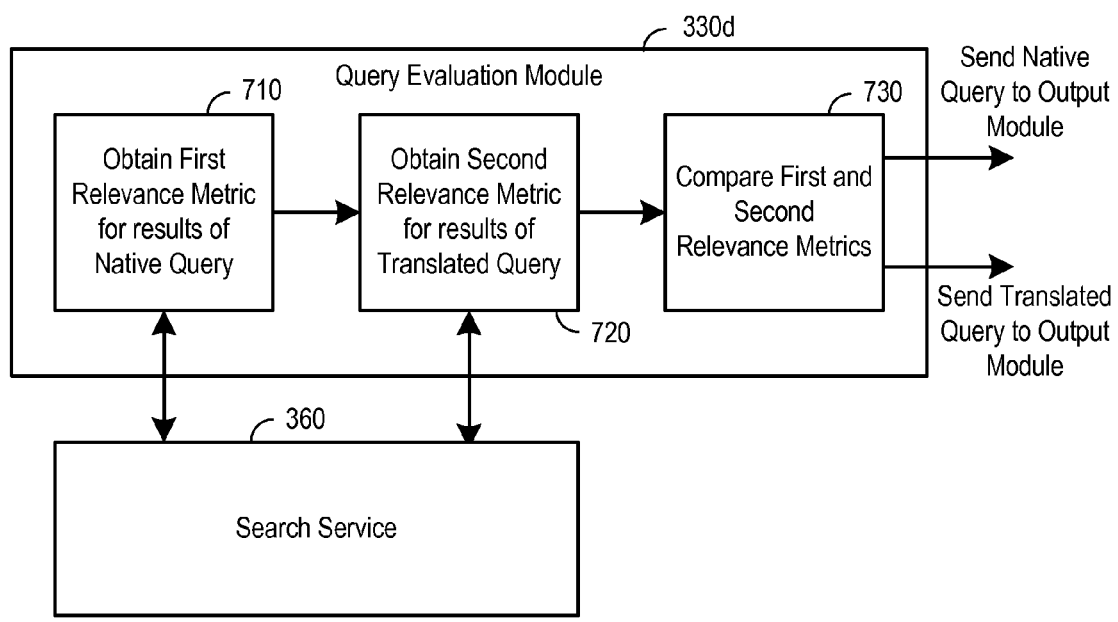

FIG. 7 is a block diagram illustrating an implementation of another query evaluation module 330d. In some implementations, the query evaluation module 330d can include a first relevance module 710, and a second relevance module 720. The first relevance module 710 can send the original search query to a search service 360. The search service 360 can identify first set of relevance scores associated with an original search query and provide the first set of relevance scores and a first set of results including relevant web pages in the first language to the first relevance module 710.

The second relevance module 720 can transmit the translated search query to the search service 360. The search service 360 can identify a second set of relevance scores associated with a translated search query. The search service 360 can provide the second set of relevance scores and a second set of results including relevant web pages in the second language to the second relevance module 720.

In some implementations, the query evaluation module 330d can include a comparison module 730. The comparison module 730 can compare the first set of relevance score and the second relevance score to determine whether an original search query or a translated search query result in more relevant search results. In some implementations, if a first relevance score is higher than a second relevance score, a first set of result associated with the original search query can be sent to an output module (e.g., output module 370 of FIG. 3). If the second relevance score is higher than the first relevance score, a second set of results associated with the translated search query can be sent to the output module. In some implementations, the comparison module can be biased to select the results associated with the original search query if the second relevance score is not significantly higher than the first relevance score.

In some implementations, any of the implementations of the query evaluation module 330a-d disclosed with respect to FIGS. 4-7 can be combined with any one or more of the other query evaluation modules 330a-d.

Figure 8:
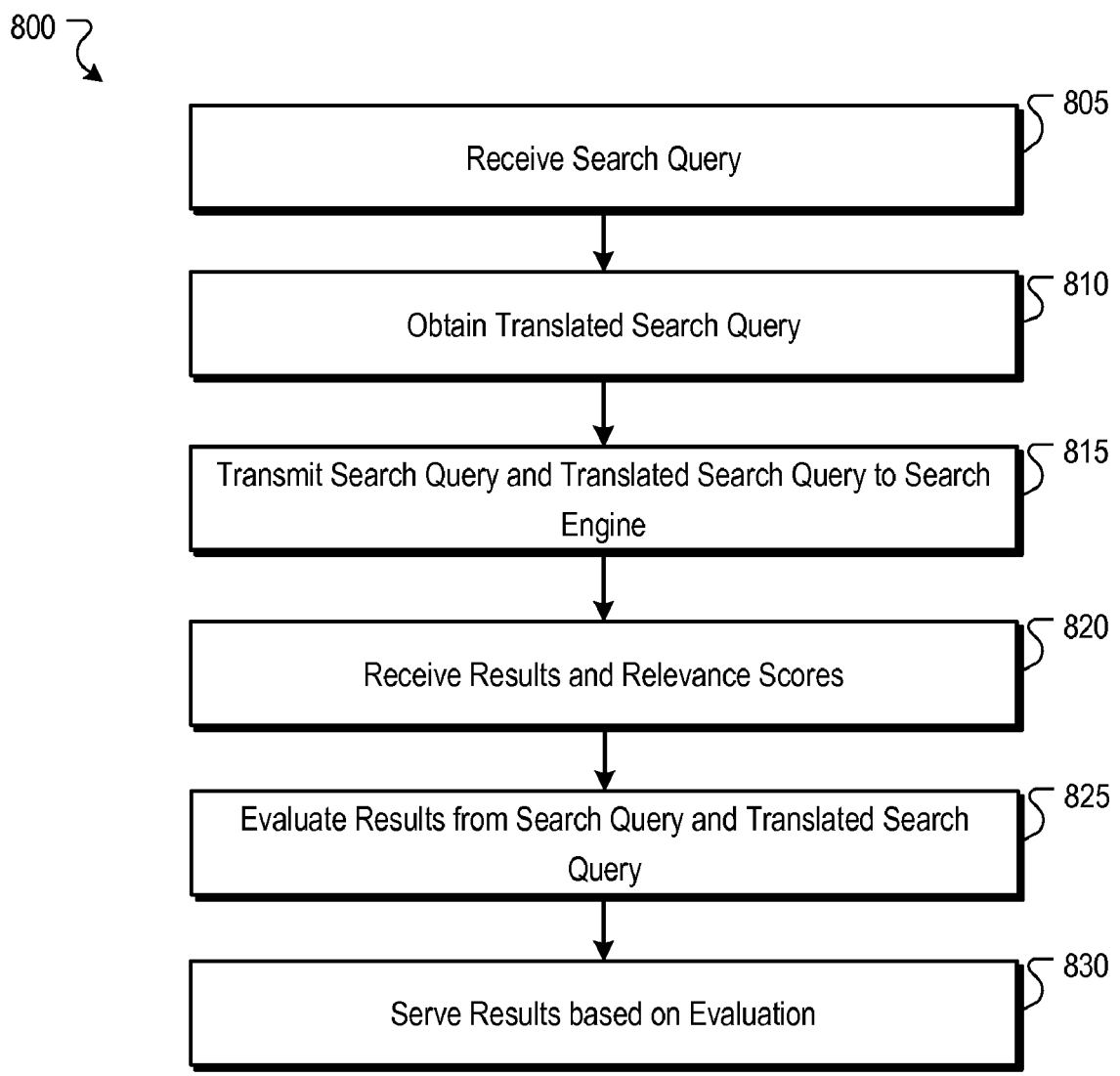
FIGS. 8-10 are flowcharts illustrating example processes of providing a cross-language search.

FIG. 8 is a flowchart illustrating an example process 800 of providing a cross-language search. The process 800 receives a search query (805). The search query can be received, for example, by an input module (e.g., input module 110 of FIG. 1B). In some implementations, the search query can be received from a search engine. For example, a cross-language search system can be an add-on component or a third party search component operable to receive the search query through an application programming interface (API). In other implementations, a cross-language search system can be integrated into the search engine, such that the input module is a search engine interface web page. In still further implementations, the input module can include a client software component operating on a client device operable to intercept a search query.

The process obtains a translated search query (810). The translated search query can be obtained, for example, from a translation service (e.g., translation service 122 of FIG. 1B) by a query evaluation module (e.g., query evaluation module 120 of FIG. 1B). In some implementations, the translation service can produce a translated search query and a confidence score associated with the translated search query. The confidence score can indicate a confidence that the translation is correct.

The process transmits the search query and translated search query to a search engine (815). The search query and translated search query can be transmitted to the search engine, for example, by a query evaluation module (e.g., query evaluation module 120 of FIG. 1B). In some implementations, the translated search query can include multiple translations of the original search query, each of which are different translations of the original search query (e.g., in the same language or different languages).

The process receives results and relevance scores (820). The results and relevance scores can be received, for example, from the search engine (e.g., search engine 124 of FIG. 1B) by a query evaluation module (e.g., query evaluation module 120 of FIG. 1B). The results and relevance scores can include a first set of results and a first set of relevance scores associated with the original search query. The results and relevance scores can also include a second set of results and a second set of relevance scores associated with the translated search query.

The process evaluates the results and relevance scores from the search query and translated search query (825). The results and relevance scores can be evaluated, for example, by a query evaluation module (e.g., query evaluation module 120 of FIG. 1B). In some implementations, the search query can be compared to a list of local and foreign entities, the translation quality can be tested using a confidence score, a relevance score of translated search query results can be tested against a minimum relevance threshold, and/or the original search query results can be compared to results from the translated search query based on a first and second relevance score respectively associated with the results of the queries.

The process serves results based on the results of the evaluation (830). The results can be served, for example, by an output module (e.g., output module 140 of FIG. 1B). In some implementations the results can include results from the original search query and/or the translated search query. In other implementations the results can include a list of web pages that are most relevant to the original search query or to the translated search query.

Figure 9:
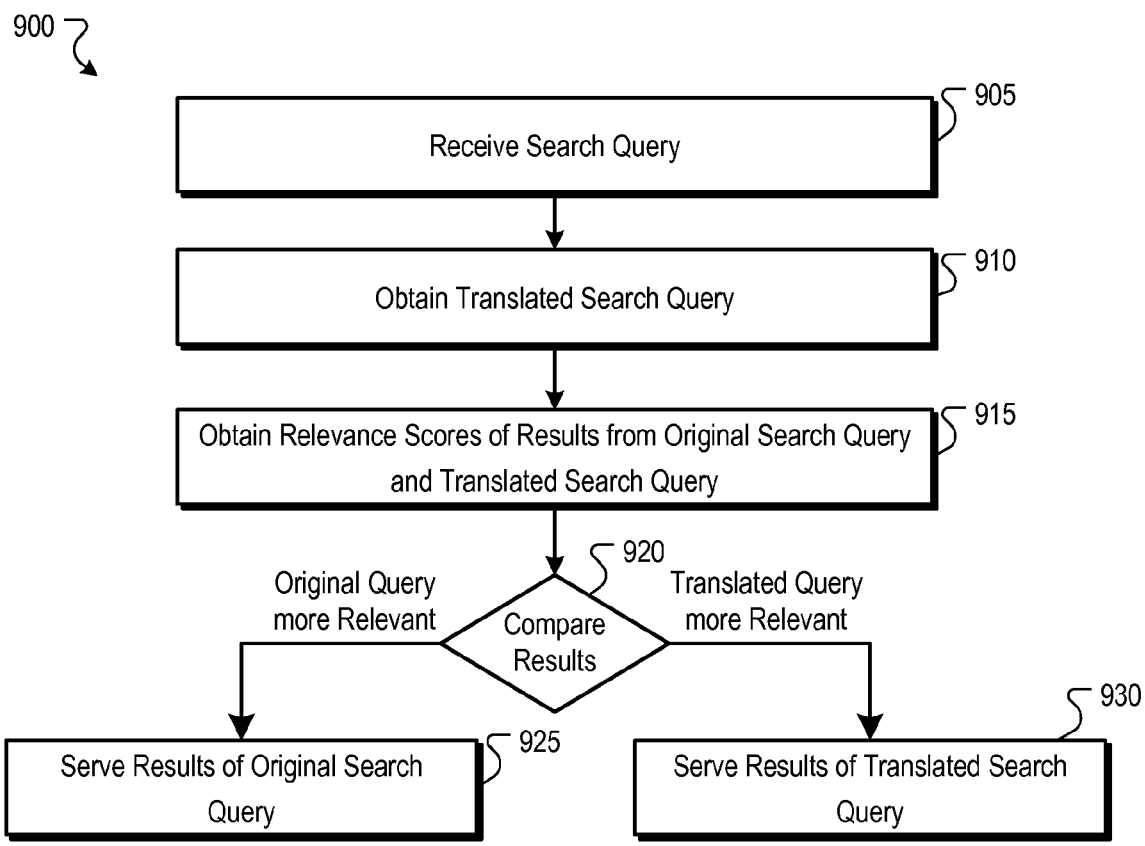

FIG. 9 is a flowchart illustrating an example process 900 of providing a cross-language search. The process receives a search query (905). The search query can be received, for example, by an input module (e.g., input module 110 of FIG. 1B). In some implementations, the search query can be received from a search engine interface. For example, a cross-language search system can be an add-on component or a third party search component operable to receive the search query from a search engine interface. In other implementations, a cross-language search system can be integrated into the search engine, such that the input module is a search engine interface web page. In still further implementations, the input module can include a client software component operating on a client device operable to intercept a search query.

The process obtains a translated search query (910). The translated search query can be obtained, for example, from a translation service (e.g., translation service 122 of FIG. 1B) by a query evaluation module (e.g., query evaluation module 120 of FIG. 1B). In some implementations, the translation service can produce a translated search query and a confidence score associated with the translated search query. The confidence score can indicate a confidence that the translation is correct.

The process obtains relevance scores of results from the original search query and translated search query (915). Relevance scores for the original search query and translated search query results can be obtained, for example, by a query evaluation module (e.g., query evaluation module 120 of FIG. 1B) from a search engine (e.g., search engine 124 of FIG. 1B). In some implementations, the original search query and translated search query can be transmitted to a search engine. The search engine can provide a first set of results and a first set of relevance scores associated with the original search query and a second set of results and second set of relevance scores associated with the translated search query.

The process can compare the results of the search query and the translated search query (920). The results of the search query and the translated search query can be compared, for example, by a query evaluation module (e.g., query evaluation module 120 of FIG. 1B). In some implementations, comparing the results of the original search query and the translated search query can include comparing the first set of relevance scores and to the second set of relevance scores. In some implementations, the first set of relevance scores and second set of relevance scores can be compared to determine whether to use the original search query or the translated search query based on which search query has more relevant results as indicated by the respective relevance scores.

If the process determines that the original search query yields more relevant results, the process serves the results of the original search query (925). The original search query results can be served, for example, by an output module (e.g., output module 140 of FIG. 1B) in conjunction with a query evaluation module (e.g., query evaluation module 120 of FIG. 1B). In some implementations, the results of the search query can be served to the client device that submitted the search query.

If the process determines that the translated search query yields more relevant results, the process serves translated search query (930). The translated search query can be served, for example, by an output module (e.g., output module 140 of FIG. 1B) in conjunction with a query evaluation module (e.g., query evaluation module 120 of FIG. 1B). In some implementations, the results of the translated search query can be served to the client device that submitted the search query.

Figure 10:
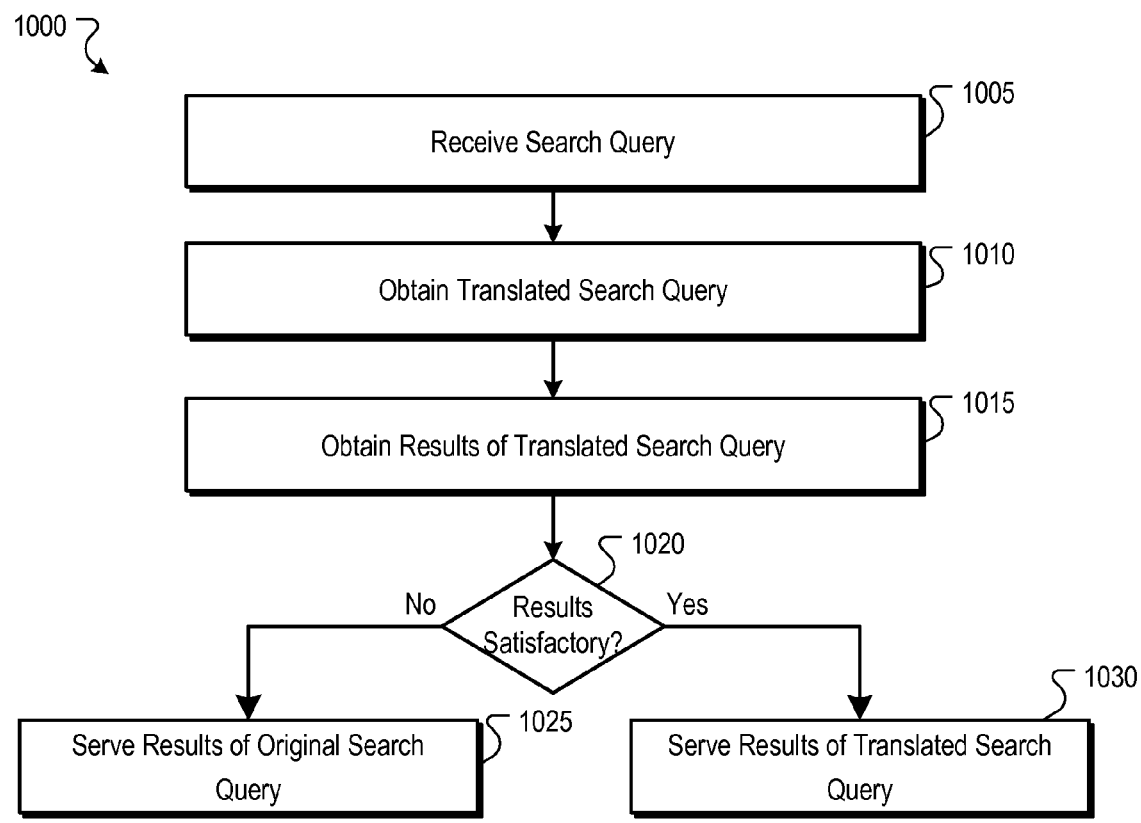

FIG. 10 is a flowchart illustrating another example method of providing a cross-language search. The process receives a search query (1005). The search query can be received, for example, by an input module (e.g., input module 110 of FIG. 1B). In some implementations, the search query can be received from a search engine interface. For example, a cross-language search system can be an add-on component or a third party search component operable to receive the search query from a search engine interface. In other implementations, a cross-language search system can be integrated into the search engine, such that the input module is a search engine interface web page. In still further implementations, the input module can include a client software component operating on a client device operable to intercept a search query.

The process obtains a translated search query (1010). The translated search query can be obtained, for example, from a translation module (e.g., translation service 122 of FIG. 1B) by a query evaluation module (e.g., query evaluation module 120 of FIG. 1B). In some implementations, the translation service can provide a translated search query and a confidence score associated with the translated search query. The confidence score can indicate a confidence that the translation is correct.

The process obtains results from the translated search query (1015). The translated search query results can be obtained, for example, by a query evaluation module (e.g., query evaluation module 120 of FIG. 1B). In some implementations, the translated search query can be transmitted to a search engine (e.g., search engine 124 of FIG. 1B). The search engine can identify a set of web pages relevant to the translated search query and a set of relevance scores associated with the set of relevant web pages. The search engine can provide the results (e.g., relevant web pages and associated relevance scores) to the query evaluation module.

The process determines whether the results of the translated search query are satisfactory (1020). The determination of whether the translated search query results are satisfactory, for example, can be performed by a query evaluation module (e.g., query evaluation module 120 of FIG. 1B). In some implementations, determination of whether the results from translated search query are satisfactory can be based on the set of relevance scores (e.g., individually or in aggregate) meeting a minimum relevance score threshold, the relevance scores of the results associated with the translated search query being better than a relevance score of the results associated with an original search query, the translation confidence score associated with the translated search query meeting a minimum confidence threshold, or an token from the search query or translated search query matching an entity from an entity data store.

If the process determines that the results of translated search query are not satisfactory, the process serves the results of the original search query (1025). The results of original search query can be served, for example, by a query evaluation module (e.g., query evaluation module 120 of FIG. 1B) in conjunction with an output module (e.g., output module 140 of FIG. 1B). In some implementations, the results of the search query can be served to the client device that submitted the search query.

If the process determines that the results of the translated search query are satisfactory, the process serves the results of the translated search query (1030). The results of the translated search query can be served, for example, by a query evaluation module (e.g., query evaluation module 120 of FIG. 1B) in conjunction with an output module (e.g., output module 140 of FIG. 1B). In some implementations, the results of the translated search query can be served to the client device that submitted the search query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for performing cross-language search, comprising:
   receiving an original search query in a first language;
   determining that the original search query includes an entity, the entity being one or more words that are a noun indicative of a place of origin where a second language is primarily spoken, the second language being different from the first language; and
   in response to the determination:
      obtaining a translated search query for the original search query, the translated search query being in the second language;
      determining that the translated search query is a candidate for a cross-language search, wherein the determining comprises:
         identifying a number of previous queries that have included the entity from a list of foreign entities;
         comparing the number of previous queries including the entity to a threshold number of queries;
         determining that the number of previous queries that have included the entity exceeds the threshold number of queries; and
         determining that the translated search query including the entity is a candidate in response to determining that the number of previous queries that have included the entity exceeds the threshold number of queries; and
generating search results relevant to the translated search query in response to determining that the translated search query is a candidate for a cross-language search.

2. The computer implemented method of claim 1, wherein determining that the translated search query is a candidate for a cross-language search further comprises determining that a translation confidence score for the translated search query exceeds a translation confidence threshold for search queries that are candidates for cross-language search.

3. The computer implemented method of claim 1, further comprising:
   determining that search results relevant to the translated search query are to be served;
   obtaining a translated snippet of web pages resulting from the translated search query; and
   serving a search results page comprising the translated snippets of web pages resulting from the translated search query.

4. The computer implemented method of claim 1, further comprising:
   determining that the original search query includes a local entity, the local entity being one or more words that are a noun indicative of a place of origin where the first language is primarily spoken; and
   generating the search results for the original search query in response to determining that the original search query includes a local entity, the local entity being one or more words that are a noun indicative of a place of origin where the first language is primarily spoken.

5. The computer implemented method of claim 1, wherein determining that the translated search query is a candidate for a cross-language search further comprises:
   receiving a translation confidence score for the translated search query, the translation confidence score measuring a degree of confidence associated with a translation of the translated search query;
   comparing the translation confidence score to a threshold confidence score;
   determining that the translation confidence score exceeds the threshold confidence score; and
   determining that the translated search query is a candidate for a cross-language search in response to determining that the translation confidence score exceeds the threshold confidence score.

6. The computer implemented method of claim 1, wherein determining that the translated search query is a candidate for a cross-language search further comprises:
   identifying a set of web pages responsive to the translated search query and a set of relevance scores for the set of web pages;
   comparing the relevance score to a threshold relevance score;
   determining that the relevance score exceeds the threshold relevance score; and
   determining that the translated search query is a candidate for a cross-language search in response to determining that the relevance score exceeds the threshold relevance score.

7. A computer program product stored in one or more non-transitory computer readable storage media comprising executable instructions which, when executed by a processing system, cause the processing system to perform cross-language search, comprising:
   receiving an original search query in a first language;
   determining that the original search query includes an entity, the entity being one or more words that are a noun indicative of a place of origin where a second language is primarily spoken, the second language being different from the first language; and
   in response to the determination:
      obtaining a translated search query for the original search query, the translated search query being in the second language;
      determining that the translated search query is a candidate for a cross-language search, wherein the determining comprises:
         identifying a number of previous queries that have included the entity from a list of foreign entities;
         comparing the number of previous queries including the entity to a threshold number of queries;
         determining that the number of previous queries that have included the entity exceeds the threshold number of queries; and
         determining that the translated search query including the entity is a candidate in response to determining that the number of previous queries that have included the entity exceeds the threshold number of queries; and
      generating search results relevant to the translated search query in response to determining that the translated search query is a candidate for a cross-language search.

8. The computer program product of claim 7, wherein determining that the translated search query is a candidate for a cross-language search further comprises determining that a translation confidence score for the translated search query exceeds a translation confidence score threshold for search queries that are candidates for cross-language search.

9. The computer program product of claim 7, further operable to cause the processing system to perform operations comprising:
   determining that search results relevant to the translated search query are to be served;
   obtaining a translated snippet of web pages resulting from the translated search query; and
   serving a search results page comprising the translated snippets of web pages resulting from the translated search query.

10. The computer program product of claim 7, further comprising:
   determining that the original search query includes a local entity, the local entity being one or more words that are a noun indicative of a place of origin where the first language is primarily spoken; and
   generating the search results for the original search query in response to determining that the original search query includes a local entity, the local entity being one or more words that are a noun indicative of a place of origin where the first language is primarily spoken.

11. The computer program product of claim 7, wherein determining that the translated search query is a candidate for a cross-language search further comprises:
   receiving a translation confidence score for the translated search query, the translation confidence score measuring a degree of confidence associated with a translation of the translated search query;
   comparing the translation confidence score to a threshold confidence score;
   determining that the translation confidence score exceeds the threshold confidence score; and determining that the translated search query is a candidate for a cross-language search in response to determining that the translation confidence score exceeds the threshold confidence score.

12. The computer program product of claim 7, wherein determining that the translated search query is a candidate for a cross-language search further comprises:
   identifying a set of web pages responsive to the translated search query and a set of relevance scores for the set of web pages;
   comparing the relevance score to a threshold relevance score;
   determining that the relevance score exceeds the threshold relevance score; and
   determining that the translated search query is a candidate for a cross-language search in response to determining that the relevance score exceeds the threshold relevance score.

13. A system for performing cross-language search, comprising:
   a data processing apparatus;
   a data store storing instructions that, when executed by the data processing apparatus, cause the data processing apparatus to define:
   an input module operable to receive an original search query in a first language from a user;
   a query evaluation module operable to determine that the original search query includes an entity, the entity being one or more words that are a noun indicative of a place of origin where a second language is primarily spoken, the second language being different from the first language; and in response to the determination:
      obtain a translated search query for the original search query, the translated search query being in the second language;
      determine that the translated search query is a candidate for a cross-language search, wherein the determining comprises:
         identifying a number of previous queries that have included the entity from a list of foreign entities;
         comparing the number of previous queries including the entity to a threshold number of queries;
         determining that the number of previous queries that have included the entity exceeds the threshold number of queries; and
         determining that the translated search query including the entity is a candidate in response to determining that the number of previous queries that have included the entity exceeds the threshold number of queries; and
   an output module operable to generate search results relevant to the translated search query in response to determining that the translated search query is a candidate for a cross-language search.

14. The system of claim 13, wherein the output module is operable to obtain a translated snippet of a web page resulting from the translated search query, and wherein the search results page comprises the translated snippet of the web page resulting from the translated search query.

15. The system of claim 13, wherein determining that the translated search query is a candidate for a cross-language search further comprises:
   identifying a set of web pages responsive to the translated search query and a set of relevance scores for the set of web pages;
   comparing the relevance score to a threshold relevance score;
   determining that the relevance score exceeds the threshold relevance score; and
   determining that the translated search query is a candidate for a cross-language search in response to determining that the relevance score exceeds the threshold relevance score.

16. A computer implemented method for performing cross-language search, comprising:
   receiving an original search query in a first language;
   determining that the original search query includes an entity, the entity being one or more words that are a noun indicative of a place of origin where a second language is primarily spoken, the second language being different from the first language; and
   in response to the determination:
      obtaining a translated search query for the original search query, the translated search query being in the second language;
      determining that the translated search query is a candidate for a cross-language search, wherein the determining comprises:
         obtaining a number of previous queries that correspond to the translated search query;
         comparing the number of previous queries to a threshold number of queries;
         determining that the number of previous queries exceeds the threshold number of queries; and
         determining that the translated search query is a candidate for a cross-language search in response to determining that the number of previous queries exceeds the threshold number of queries; and
      generating search results relevant to the translated search query in response to determining that the translated search query is a candidate for a cross-language search.

17. The method of claim 16, wherein determining that the translated search query is a candidate for a cross-language search further comprises:
   identifying a set of web pages responsive to the translated search query and a set of relevance scores for the set of web pages;
   comparing the relevance score to a threshold relevance score;
   determining that the relevance score exceeds the threshold relevance score; and
   determining that the translated search query is a candidate for a cross-language search in response to determining that the relevance score exceeds the threshold relevance score.

18. A computer program product stored in one or more non-transitory computer readable storage media comprising executable instructions which, when executed by a processing system, cause the processing system to perform cross-language search, comprising:
   receiving an original search query in a first language;
   determining that the original search query includes an entity, the entity being one or more words that are a noun indicative of a place of origin where a second language is primarily spoken, the second language being different from the first language; and
   in response to the determination:
      obtaining a translated search query for the original search query, the translated search query being in the second language;
      determining that the translated search query is a candidate for a cross-language search, wherein the determining comprises:

obtaining a number of previous queries that correspond to the translated search query;
comparing the number of previous queries to a threshold number of queries;
determining that the number of previous queries exceeds the threshold number of queries; and
determining that the translated search query is a candidate for a cross-language search in response to determining that the number of previous queries exceeds the threshold number of queries; and
generating search results relevant to the translated search query in response to determining that the translated search query is a candidate for a cross-language search.

19. The computer program product of claim 18, wherein determining that the translated search query is a candidate for a cross-language search further comprises:
identifying a set of web pages responsive to the translated search query and a set of relevance scores for the set of web pages;
comparing the relevance score to a threshold relevance score;
determining that the relevance score exceeds the threshold relevance score; and
determining that the translated search query is a candidate for a cross-language search in response to determining that the relevance score exceeds the threshold relevance score.

20. A system for performing cross-language search, comprising:
a data processing apparatus;
a data store storing instructions that, when executed by the data processing apparatus, cause the data processing apparatus to define:
an input module operable to receive an original search query in a first language from a user;
a query evaluation module operable to determine that the original search query includes an entity, the entity being one or more words that are a noun indicative of a place of origin where a second language is primarily spoken, the second language being different from the first language; and in response to the determination:
obtain a translated search query for the original search query, the translated search query being in the second language;
determine that the translated search query is a candidate for a cross-language search, wherein the determining comprises:
obtaining a number of previous queries that correspond to the translated search query;
comparing the number of previous queries to a threshold number of queries;
determining that the number of previous queries exceeds the threshold number of queries; and
determining that the translated search query is a candidate for a cross-language search in response to determining that the number of previous queries exceeds the threshold number of queries; and
an output module operable to generate search results relevant to the translated search query in response to determining that the translated search query is a candidate for a cross-language search.

21. The system of claim 20, determining that the translated search query is a candidate for a cross-language search further comprises:
identifying a set of web pages responsive to the translated search query and a set of relevance scores for the set of web pages;
comparing the relevance score to a threshold relevance score;
determining that the relevance score exceeds the threshold relevance score; and
determining that the translated search query is a candidate for a cross-language search in response to determining that the relevance score exceeds the threshold relevance score.

* * * * *

UNITED STATES PATENT AND TRADEMARK OFFICE
CERTIFICATE OF CORRECTION

PATENT NO.       : 8,250,046 B2
APPLICATION NO.  : 12/421163
DATED            : August 21, 2012
INVENTOR(S)      : Maureen Heymans It is certified that error appears in the above-identified patent and that said Letters Patent is hereby corrected as shown below:

In Claim 7, Line 17, Column 24, delete "numberof" and insert -- number of --, therefor.

Signed and Sealed this
Thirteenth Day of November, 2012

David J. Kappos
*Director of the United States Patent and Trademark Office*